United States Patent
Wichmann

(10) Patent No.: US 6,457,698 B2
(45) Date of Patent: Oct. 1, 2002

(54) BYPASS VALVE

(75) Inventor: Mark E. Wichmann, Chicago, IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/853,308

(22) Filed: May 11, 2001

Related U.S. Application Data

(63) Continuation-in-part of application No. 09/595,171, filed on Jun. 16, 2000, now abandoned.

(51) Int. Cl.[7] .......................... F16K 11/07; F16K 35/02
(52) U.S. Cl. ....................................................... 251/108
(58) Field of Search ............................... 251/108, 107; 137/625

(56) References Cited

U.S. PATENT DOCUMENTS

| | | |
|---|---|---|
| 587,099 A | 7/1897 | Levi |
| 1,596,913 A | 8/1926 | Wilson |
| 2,766,771 A | 10/1956 | Wenzel |
| 2,988,107 A | 6/1961 | Rudelick |
| 3,052,263 A | 9/1962 | Gordon |
| 3,090,396 A | 5/1963 | Rudelick |
| 3,471,021 A | 10/1969 | Prizler |
| 3,504,706 A | 4/1970 | Schmitz |
| 3,764,103 A | 10/1973 | Oliverio |
| 3,863,675 A | 2/1975 | Wiltshire |
| 3,911,956 A | 10/1975 | LeBreton |
| 3,993,099 A | 11/1976 | Nightingale |
| 4,355,659 A | 10/1982 | Kelchner |
| 4,469,119 A | 9/1984 | Snyder |
| 4,469,131 A | 9/1984 | Traylor |
| 4,506,697 A | 3/1985 | Marchant |
| 4,632,150 A | 12/1986 | Gagas |
| 5,152,321 A | 10/1992 | Drager |
| 5,816,290 A | 10/1998 | Altshuler |
| 5,931,196 A | 8/1999 | Bernardi |

FOREIGN PATENT DOCUMENTS

| | | |
|---|---|---|
| AU | 2488067 | 11/1972 |
| DE | 51071 | 3/1890 |
| DE | 4306610 | 8/1994 |
| GB | 2 159 921 A | 12/1985 |

Primary Examiner—John Fox
(74) Attorney, Agent, or Firm—Greer, Burns & Crain, Ltd.

(57) ABSTRACT

A bypass valve for directing fluid flow, where the bypass valve includes a valve body with a notch in at least one end thereof and a spool seated within the valve body. The spool is rotatable within the valve body. One preferred embodiment of the present invention also includes at least one endcap attached to an axial end portion of the spool, where the endcap includes a protrusion extending thereon for preventing relative rotation between the spool and the valve body when the protrusion is positioned within the notch. A further aspect of the present invention relates to a bypass valve with a valve body including a plurality of ports and a generally cylindrical inner periphery, as well as a spool seated within the valve body, where the spool is rotatable and axially translatable within the valve body. The spool further preferably includes a top seal seated upon a seal seating surface, where the top seal acts in one mode to block a service inlet port, without blocking the other ports, or, in another mode, blocks the service inlet port and the service outlet port, without blocking the other ports.

6 Claims, 7 Drawing Sheets

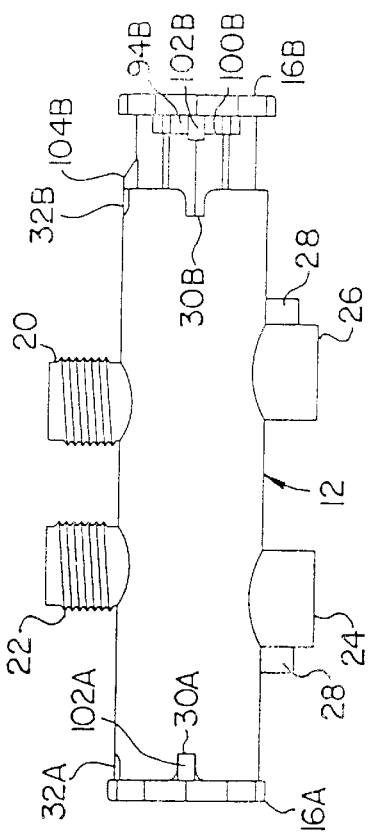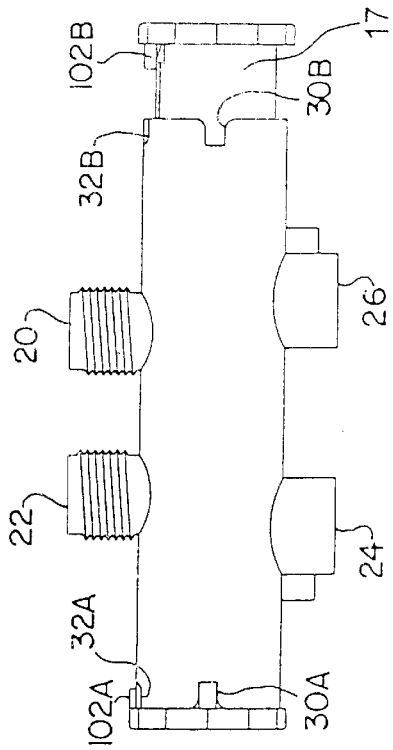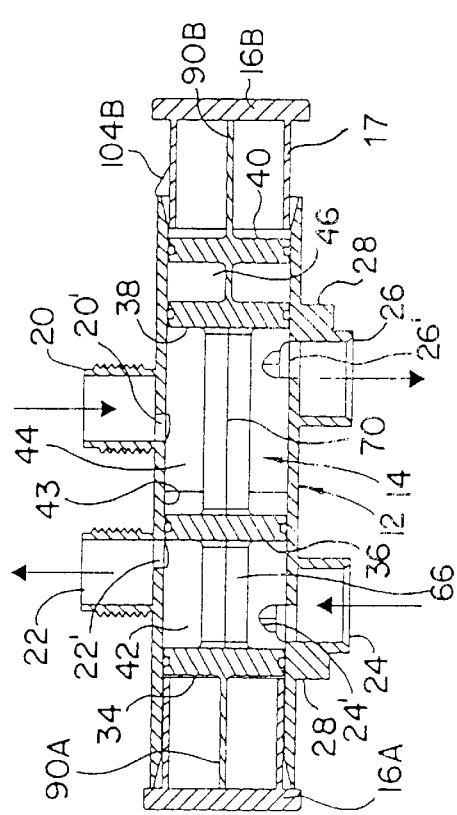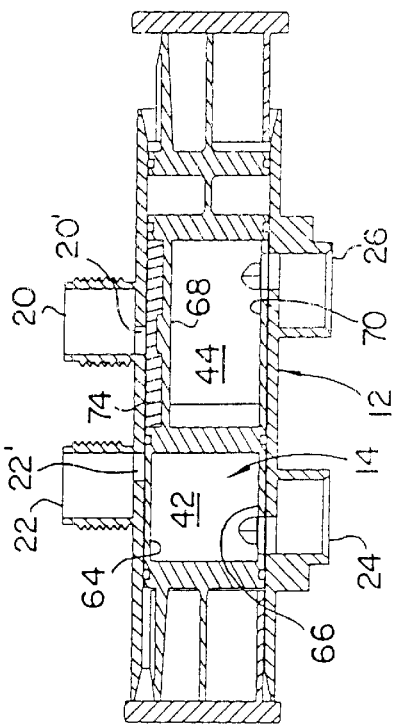

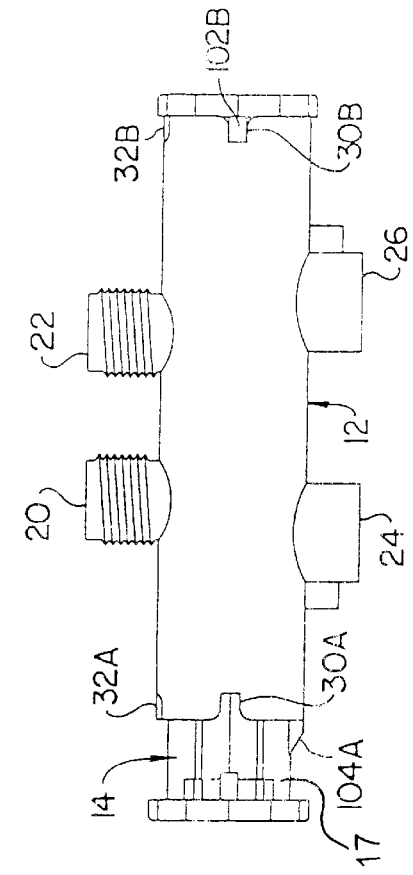
Fig. 8A
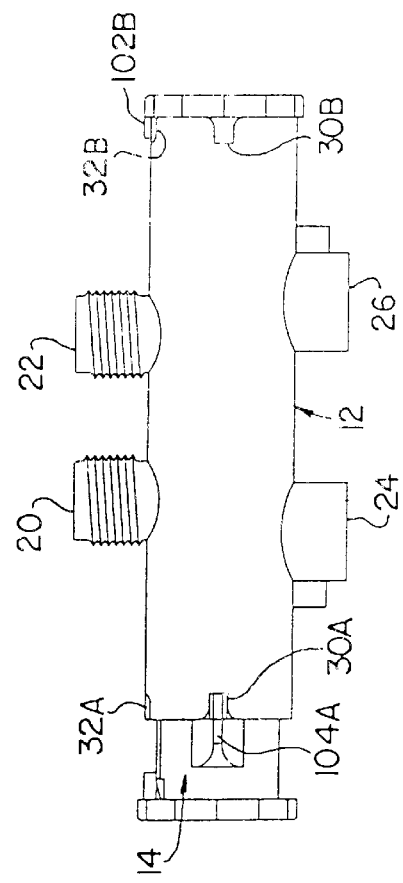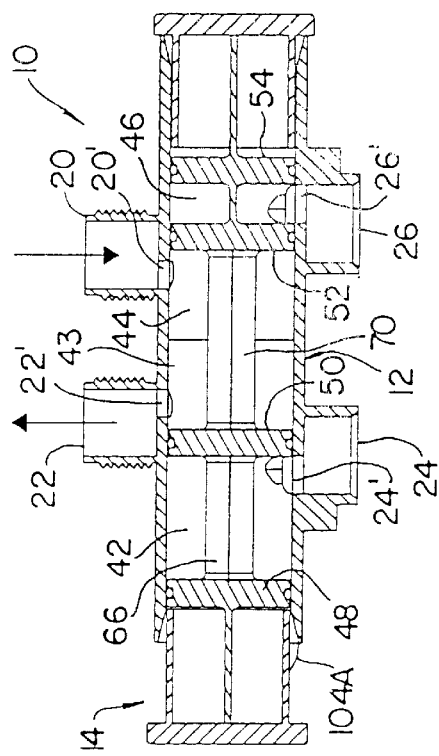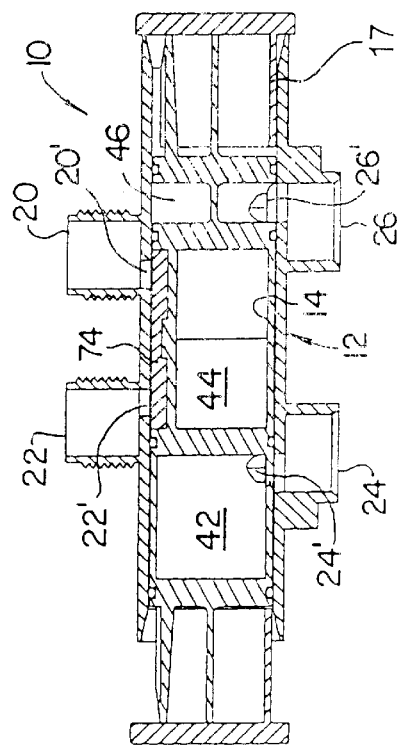
Fig. 8B
Fig. 9A
Fig. 9B

BYPASS VALVE

RELATED APPLICATION

This application is a Continuation-In-Part of U.S. Ser. No. 09/595,171 filed Jun. 16, 2000 now abandoned and entitled "Bypass Valve".

BACKGROUND

The present invention relates generally to a bypass valve, and more particularly to a bypass valve, such as a valve of the type used with a water softener, that includes a set of service ports (inlet and outlet) on one side thereof and a set of valve ports (inlet and outlet) on the opposite side thereof. One important feature of the present invention is that it includes structures for maintaining the valve in the selected mode of operation. An addition important feature is that the present bypass valve includes means for sealing off the service inlet port, while keeping the other three ports open, and means for sealing off both the service inlet port and the service outlet port, while keeping the other two ports open.

Bypass valves are known, and are used for connecting a water source to a water softener, or other water processing device, and for connecting the water softener to plumbing fixtures for use of the treated water. The known bypass valves generally have a service side facing the source of untreated water and a valve side facing the water softener. Service ports, located on the service side, include a service inlet port for connecting the water source to the bypass valve, and a service outlet port for connecting the bypass valve to the plumbing fixture for use throughout the dwelling. Similarly, on the valve side, there is a valve outlet port for carrying untreated water out of the bypass valve and to the water softener, and a valve inlet port for carrying treated water from the softener to the bypass valve.

In addition, conventional bypass valves also generally include a bypass passage that is configured so that water entering the valve through the service inlet port can exit the valve through the service outlet port, thus skipping treatment by the softener. One example of such a bypass valve is disclosed in U.S. Pat. No. 5,152,321 to Drager et al. The use of such a bypass valve, which is normally manually actuated, prolongs the supply of treated softener water when the use of harder water is adequate, such as for watering the lawn or for washing a car.

Known bypass valves, such as those of the type described in the Drager et al. patent, normally include a spool that is rotatably seated within a valve body. Rotation of the spool within the valve body is normally used to switch modes from a normal operation mode, in which the water passes through the water softener, to a bypass mode, in which the water bypasses the water softener and is simply directed from the service inlet, through the bypass valve, and then through the service outlet to be used in the dwelling. In some bypass valves, the spool can be accidentally rotated (such as by being accidentally bumped), resulting in an unintentional switch from one mode to the other.

Another problem with many of the current bypass valves is that there is no simple way to close the service inlet port. Instead, in these bypass valves, the service inlet port is always open, whether it is in communication with the service outlet port or in communication with the valve outlet port. The present inventor has determined that closing the service inlet port, without closing the other ports, is desirable because it allows pressure to be removed, and for the water to be drained, from the portion of the plumbing system positioned after the bypass valve.

Thus, in light of the above, one object of the present invention is to provide an improved bypass valve that can be more securely retained in a particular mode.

Another object of the present invention is to provide an improved bypass valve where the service inlet port can be blocked, without blocking the remainder of the ports.

A third object of the present invention is to provide an improved bypass valve in which both the service inlet port and the service outlet port can be blocked, without blocking the other ports.

An additional object of the present invention is to provide an improved bypass valve in which the fluid flow during the normal operation mode is essentially unhindered by the spool since the supporting ribs of the spool are all positioned very close to the inner periphery of the valve body.

These and other objects of the present invention are discussed or ill be apparent from the following detailed description of the present invention.

BRIEF SUMMARY OF THE INVENTION

The above-listed objects are met or exceeded by the present bypass valve, which includes a valve body and a spool that is seated for rotation within the valve body, and preferably further includes structure for selectively preventing relative rotation between the valve body and the spool after the desired mode of operation is selected. Preferably, the spool of the present bypass valve is also configured for axial translation within the valve body, in which case there is also preferably structure for maintaining the spool at the desired axial location. Accordingly, with one or both of these two structures, the bypass valve of the present invention can be securely maintained in the selected mode of operation.

One optional preferred feature of the present invention is the ability to prevent fluid from passing through the service inlet port, while still allowing fluid to flow through the other ports. With the service inlet port closed, the fluid in the system can be drained back to the bypass valve. A related optional feature of the present invention is the ability of certain embodiments to prevent fluid from passing through both the service inlet port and the service outlet port. With this feature, the water softener, or other processing device, can be isolated. Additionally, additional fluid flow into the system downstream from the water softener can also be prevented.

The present invention may also optionally include a spool in which the supporting ribs are positioned near the inner periphery of the valve body. With such a configuration, the fluid that flows through the bypass valve during the normal operating mode is essentially unhindered by the spool, resulting in a reduction in undesirable pressure drops common in other bypass valves in which the supporting ribs extend axially through the center of the spool, partially obstructing the fluid flow through the valve.

More specifically, the present invention provides a bypass valve for directing fluid flow, where the bypass valve includes a valve body with a notch in at least one end thereof and a spool seated within the valve body. The spool is rotatable within the valve body. One preferred embodiment of the present invention also includes at least one endcap attached to an axial end portion of the spool, where the endcap includes a protrusion extending thereon for preventing relative rotation between the spool and the valve body when the protrusion is positioned within the notch. In the preferred embodiment, the protrusion is provided with an alignment formation for preventing unwanted obstruction of the protrusion to the desired axial movement of the spool.

Another aspect of the present invention relates to a bypass valve for directing fluid flow, where the bypass valve includes a valve body with a notch in at least one end thereof, a spool seated within the valve body, and where the spool is axially translatable within the valve body. This embodiment preferably also includes at least one endcap attached to an axial end portion of the spool. The endcap further includes a locking snap positioned on an outer periphery thereof, with the locking snap being configured and arranged to maintain the spool in a first axial position with respect to the valve body, and wherein when the locking snap is unlocked, the spool may be moved to a second axial position.

Additionally, the present invention also relates to a bypass valve for directing fluid flow, where the bypass valve includes a valve body with a service inlet port, a service outlet port, a valve inlet port, and a valve outlet port, as well as a spool seated within the valve body. The spool is preferably rotatable and axially translatable within the valve body, whereby particular combinations of rotation and axial translation of said spool result in the following modes of operation: (1) a first mode in which the fluid flow is directed from the service inlet port, through a first portion of the bypass valve, then to the valve outlet port, then to the valve inlet port, through a second portion of the bypass valve, and finally out the service outlet port; (2) a second mode in which the fluid flow is blocked from passing through the service inlet port, but the fluid flow is unhindered from passing through the service outlet port; (3) a third mode in which the fluid flow is directed from the service inlet port, through the bypass valve, and then to the service outlet port; and (4) a fourth mode in which the fluid flow is blocked from passing through the service inlet port as well as being blocked from passing through the service outlet port.

An additional aspect of the present invention relates to a bypass valve for directing fluid flow, where the bypass valve includes a valve body with a notch near each axial end thereof and a spool seated within the valve body, where the spool is both rotatable and axially translatable within the valve body. Preferably, there is also an endcap attached to each axial end of the spool, and each endcap preferably includes a protrusion extending outwardly therefrom for preventing relative rotation between the spool and the valve body when the protrusion is positioned within the notch. Additionally, as stated above, in the preferred embodiment, the protrusion is provided with an alignment formation for preventing unwanted obstruction of the protrusion to the desired axial movement of the spool.

A further aspect of the present invention relates to a bypass valve with a valve body including a plurality of ports and a generally cylindrical inner periphery, as well as a spool seated within the valve body, where the spool is rotatable within the valve body. The spool further preferably includes a relatively flat wall defining a seal seating surface. In addition, there is also preferably a top seal seated upon the seal seating surface, where the top seal includes a relatively flat bottom surface configured to match the seal seating surface, as well as a curved top surface configured to match the inner periphery of the valve body.

BRIEF DESCRIPTION OF THE SEVERAL VIEWS OF THE DRAWINGS

Preferred embodiments of the present invention are described herein with reference to the drawings wherein:

FIG. 6A is a cross-sectional view of the bypass valve of FIG. 1, showing a first mode of operation;

FIG. 6B shows a side view of the bypass valve of FIG. 1 positioned in the first mode of operation, as in FIG. 6A;

FIG. 7A is a cross-sectional view of the bypass valve of FIG. 1, showing a second mode of operation;

FIG. 7B shows a side view of the bypass valve of FIG. 1 positioned in the second mode of operation, as in FIG. 7A;

FIG. 8A is a cross-sectional view of the bypass valve of FIG. 1, showing a third mode of operation;

FIG. 8B shows a side view of the bypass valve of FIG. 1 positioned in the third mode of operation, as in FIG. 8A;

FIG. 9A is a cross-sectional view of the bypass valve of FIG. 1, showing a fourth mode of operation;

FIG. 9B shows a side view of the bypass valve of FIG. 1 positioned in the fourth mode of operation, as in FIG. 9A;

DETAILED DESCRIPTION OF THE INVENTION

Figure 1:
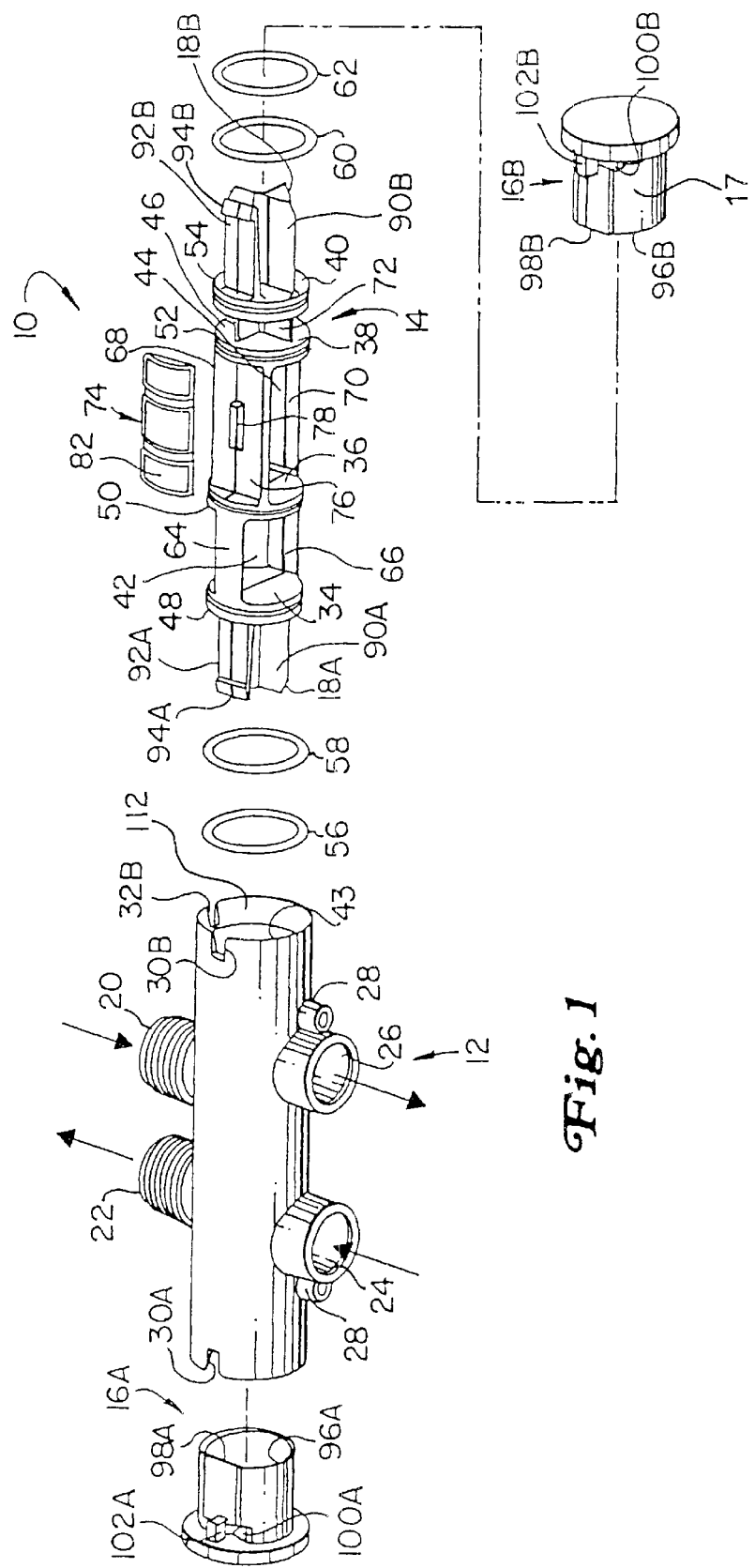
FIG. 1 is an exploded view of a first embodiment of the present bypass valve.

Referring now to FIG. 1, a first preferred embodiment of the present bypass valve 10 will be explained. Briefly, FIG. 1 shows, in an exploded view, a valve body 12, a stem or spool 14, and a pair of endcaps 16A and 16B. As can be seen from FIG. 1, the spool 14 is configured to be seated within the valve body 12, and the endcaps 16A/16B each have a wall 17 and are each positioned upon the axial ends 18A/18B of the spool 14 (such as shown in FIGS. 6A and 6B).

The valve body 12 includes two threaded service ports (service inlet port 20 and service outlet port 22) and two valve ports (valve inlet port 24 and valve outlet port 26). As known to those skilled in the art, service inlet port 20 is normally connected to the water supply at or near the point that the water first enters the dwelling, valve outlet port 26 is normally connected to the input pipe of a water softener (not shown) or other water treatment device, valve inlet port 24 is normally connected to the water softener output pipe for receiving softened water, and service outlet port 22 is normally connected to the main plumbing input pipe of the dwelling. Thus, when the bypass valve 10 is in its normal operating mode (other modes will be described hereinbelow), untreated water enters the bypass valve 12 through service inlet port 20, exits the valve through valve outlet port 26, at which point it enters the water softener (or other water treatment device). Inside the water softener, the water is treated and it is once again directed into the valve, this time via valve input port 24. Next, the water flows through the valve and to service output port 22, where the treated water is directed to the main plumbing of the house for use in the dwelling.

In addition to ports 20, 22, 24 and 26, the valve body 12 (which is preferably configured as a generally cylindrical hollow tube) may also include mounting means, such as ears 28, for mounting the valve body 12 upon the water softener (or other treatment device). One of the important aspects of the present valve body 12 are notches 30A, 30B, 32A, and 32B (notch 32A is not shown, but is positioned in a similar location as 32B, except it is on the same edge as notch 30A). The purpose of the notches 30A, 30B, 32A and 32B, which are basically used to prevent unwanted rotation of the spool 14, will be more fully described below when describing endcaps 16A and 16B.

Turning now to spool 14, this component includes a series of partitions, such as first partition 34, second partition 36, third partition 38, and fourth partition 40. The first partition 34 and the second partition 36 define a first chamber 42 between them, in cooperation with the interior periphery 43 of the valve body 12. In a similar manner, the second partition 36 and the third partition 38 define a second chamber 44 between them and the interior periphery 43. Preferably, the second partition 36 performs the dual functions of acting as a wall for both the first chamber 42 and the second chamber 44. However, if desired, the second partition may take the form of two separate partitions, where one partition cooperates with the first partition 34 and the other cooperates with the fourth partition 38.

A third chamber 46 is defined between the third partition 38 and the fourth partition 40 in a similar manner as the first and second chambers 42, 44. If desired, the third partition 38, which serves as parts of both the second chamber 44 and the third chamber 46, may be modified into two separate partitions, similar to that described above for the second partition 36.

The outer periphery of each of the partitions 34, 36, 38, and 40 includes a groove, which is each designated, respectively, as groove 48, 50, 52 and 54. When the bypass valve 10 is assembled, an o-ring is seated in each of the grooves 48, 50, 52 and 54. These o-rings are shown in the exploded view of FIG. 1, and are designated, respectively, as o-rings 56, 58, 60 and 62. When the bypass valve 10 is assembled, the o-rings 56, 58, 60 and 62 abut against the interior periphery 43 of the valve body 12, and prevent fluid from passing across the partitions 34, 36, 38, and 40.

The partitions 34, 36, 38, and 40 are connected to each other by a plurality of supporting ribs. In particular, supporting ribs 64 and 66 connect partitions 34 and 36; supporting ribs 68 and 70 connect partitions 36 and 38, and a single supporting rib 72, which is preferably cross-shaped in cross-section, connects partitions 38 and 40.

One important feature of the present invention is that the supporting ribs 64 and 66, which surround the first chamber 42, and the supporting ribs 68 and 70, which surround the second chamber 44, are preferably set to be at or near the outer periphery of their associated partitions. As will become more apparent from the description below, placing the supporting ribs 64, 66, 68, and 70 at or near the outer periphery of the partitions allows the first and second chambers 42 and 44 to provide essentially unobstructed fluid flow through the valve when the valve is set to the normal service operating mode. Such a configuration of the supporting ribs eliminates the pressure drops caused by the centered supporting ribs of prior art devices. It should be noted that cross-shaped rib 72, which passes through the third chamber 46, need not be configured in the same manner as ribs 64, 66, 68 and 70 because fluids are not intended to flow completely through the third chamber 46, so pressure drops at this chamber are not a concern.

Another important feature of this first embodiment of the present invention is the inclusion of a top seal 74, which is configured to be seated upon a seal seating surface 76, which is the upper surface of the supporting rib 68. The seal seating surface 76 is preferably a generally flat surface, and preferably includes a projection 78 that is configured to mate with recess 80 (shown in FIGS. 3 and 5) for positioning the seal 74 upon the seal seating surface 76. Preferably, an adhesive is used to firmly affix the top seal 76 to the seal seating surface 76. Although only one configuration for securing the top seal 74 and the supporting rib 68 together has been shown, other configurations, such as the use of mechanical locking means (with or without adhesive) are also contemplated as being within the scope of the invention.

Figure 2:
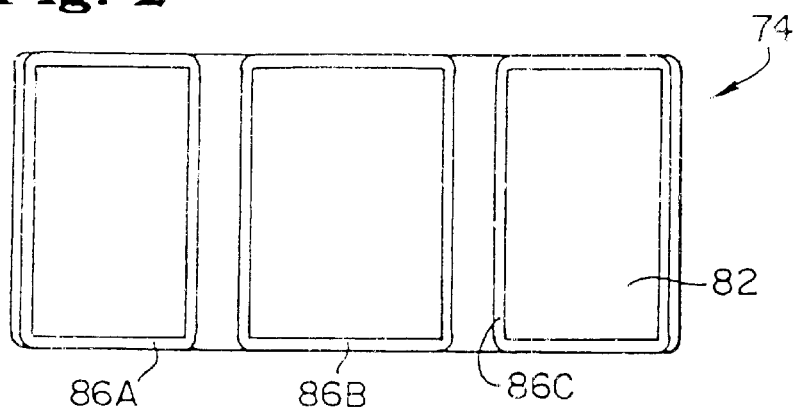
FIG. 2 is an enlarged top view of a preferred embodiment of the top seal, which is one of the components shown in the FIG. 1 embodiment.
Figure 3:
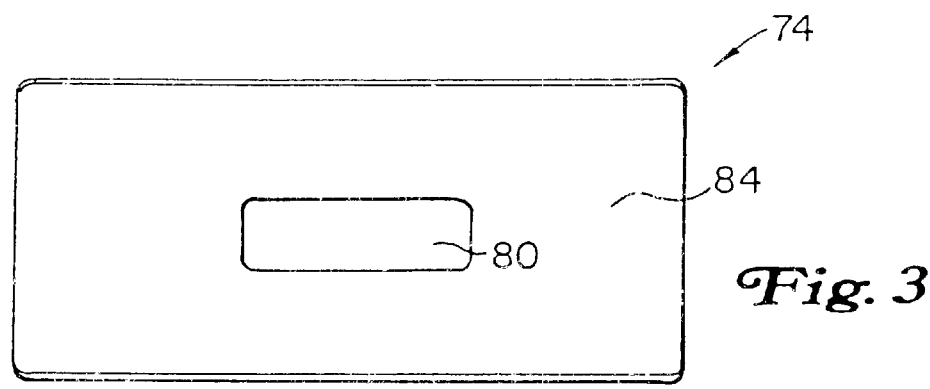
FIG. 3 is an enlarged bottom view of the top seal of FIG. 2.
Figure 4:
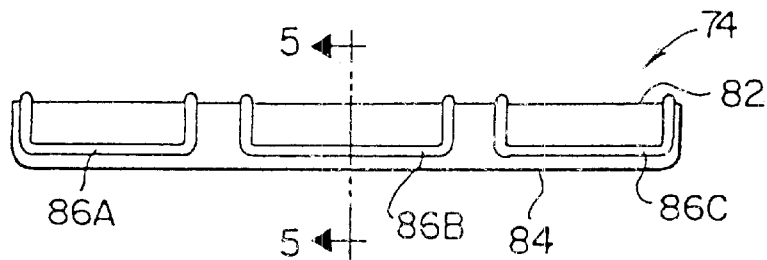
FIG. 4 is a side view of the top seal of FIG. 2.
Figure 5:
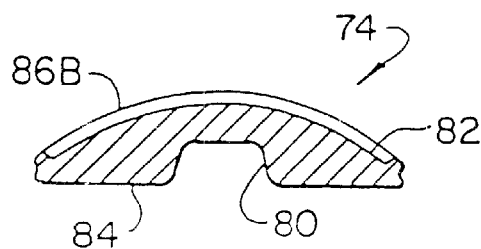
FIG. 5 is a cross-sectional view of the top seal of FIG. 2, taken along line V—V of FIG. 4.

The top seal 74 is preferably made of an elastomeric material so that a tight seal can be made with the interior periphery 43 of the valve body 12. Referring now to FIGS. 2–5, enlarged views of the top seal 74 are shown. More specifically, FIG. 2 shows a top view of top seal 74; FIG. 3 shows a bottom view; FIG. 4 shows a side view; and FIG. 5 shows a cross-sectional view taken along line V—V of FIG. 4.

As shown in FIGS. 1, 2, and 5, the top surface 82 of the top seal 74 is preferably curved with a curve that generally coincides with the curve of the interior periphery 43 of the valve body 12. There are a plurality of raised sealing lips 86A, 86B, and 86C located upon the top surface 82. As best shown in FIG. 2, these lips each define a separate closed shape so that fluid within the closed shape defined by one of the lips 86A, 86B or 86C is not passed outside of the closed shape. As best shown in FIG. 5, the bottom surface 84 of the top seal 74 is a generally flat surface (except for recess 80), so that it can be seated upon the relatively flat seal seating surface 76 of the spool 14. However, if the seal seating surface 76 includes a profile other than flat, the bottom surface 84 may also be made of a complementary profile.

Referring back to FIG. 1, it can be seen that the axial ends 18A and 18B of the spool 14 are configured for retaining, respectively, the endcaps 16A and 16B. Preferably, ends 18A and 18B each include a generally T-shaped leg (90A and 90B) and a generally flat leg (92A and 92B) that is inclined slightly upwardly. The generally flat legs 92A and 92B each preferably include a thickened portion (94A and 94B). The interior surfaces of the endcaps 16A and 16B are configured to receive the legs 90A, 90B, 92A and 92B. In particular, the T-shaped legs 90A and 90B serve to position the axial ends 18A and 18B within the curved interior surfaces 96A and 96B, and the flat legs 92A and 92B seat against the flat interior surfaces 98A and 98B. The thickened portions 94A and 94B mate with slots 100A and 100B in the endcaps 16A and 16B to secure the endcaps in place upon the axial ends 18A and 18B of the spool 14. The slight upward incline of the flat legs 92A and 92B provides a slight upward bias for directing the thickened portions 94A and 94B into the slots 100A and 100B.

Another important feature of the present invention relates to the interaction between endcap protrusions 102A/102B and notches 30A/30B and 32A/32B. As mentioned above, the spool 14 is rotatably seated within the valve body 12, whereby rotating the spool 14 changes the operating mode of the bypass valve 10. In order to prevent the spool 14 from being unintentionally rotated within the valve body 12 (which may change the operational mode of the valve 10), the projection 102A or 102B is seated within one of the notches (i.e., either notch 30A or notch 30B for projection 102A or notch 32A or notch 32B for projection 102B). Thus, even if the present bypass valve 10 is unintentionally bumped or otherwise jarred, the projection/notch combination maintains the valve in the selected mode of operation.

The basic operating modes of the first embodiment of the present bypass valve 10 will now be described while referring to FIGS. 6A through 9B. Each operational mode is arrived at by rotating and/or axially translating the spool 14 within the valve body 12 so that different valve configurations are achieved. In this discussion, FIGS. 6A, 7A, 8A and 9A each show a cross-sectional view (taken through a plane that is slightly offset from the axial center of the device) of a different operational mode. FIGS. 6B, 7B, 8B, and 9B are top views that coincide with the operation mode of the "A" figures of the same number. For example, FIGS. 6A and 6B both depict the same operation mode, which, in this case, is the service mode with normal operation, FIGS. 7A and 7B both depict the second operation mode, etc.

Referring now to FIGS. 6A and 6B, the first operational mode is depicted. In this mode, which is the normal service mode, water flows into the service inlet port 20 via opening 20', through the second chamber 44 and then out of the valve through the valve outlet port 26 (via opening 26'), whereby the fluid flows into the water softener (or other treatment device) since port 26 is connected to an input port of a water softener (not shown). The water is then treated, and is directed back into the valve 10 via valve inlet port 24 (through opening 24'). The fluid then passes through first chamber 42, and finally out of the valve through service outlet port 22 (via opening 22'), which is connected to the main plumbing of the dwelling, whereby the treated water can be used throughout the dwelling.

Referring primarily to FIG. 6B, in this first operational mode, the spool 14 is positioned axially within the valve body 12 such that it is located as far to the right (as shown in FIGS. 6A and 6B) as possible. Thus, since the spool 14 is axially longer than the valve body 12, a portion of the endcap 16B (the right hand endcap, as shown in FIG. 6B) sticks out from the valve body 12. Accordingly, only one of the endcap protrusions (protrusion 102A) mates with one of the notches (in this case, notch 30A), while the other protrusion (protrusion 102B) is un-mated with any notch.

As can be seen from the cross-sectional view of FIG. 6A, in this operational mode the first partition 34 (along with its associated o-ring) prevents the fluid from flowing out of the bypass valve in the leftward direction, since this partition is positioned to the left of openings 22' and 24'. The second partition 36 (along with its associated o-ring) separates the treated water flowing between openings 24' and 22' from the untreated water flowing between openings 20' and 26' (since this partition is located between openings 22' and 20' as well as between openings 24' and 26'). In addition, the third partition 38 (and the associated o-ring) prevents fluid from flowing out of chamber 44 in the rightward direction since it is positioned to the right of openings 20' and 26'.

In order to maintain the spool 14 in the axial position of FIGS. 6A and 6B, a locking snap, such as locking snap 104B, may be included. As the locking snap is an important feature of the invention, a full description of this feature will be provided when describing the second embodiment and while referring to FIGS. 10, 11, and 13. It should be noted that although described in more detail in the second embodiment, the locking tab is preferably also provided with this first embodiment. Briefly, locking tab 104B is a finger that is inclined radially outwardly. The end of the finger of the locking tab 104B abuts against the axial end surface of the valve body 12, thereby preventing the spool 14 from moving to the left. When such leftward movement is desired, the finger is simply depressed radially inwardly, whereby it no longer abuts against the end surface.

As can be seen from reviewing FIG. 1 in connection with FIG. 6A, the supporting ribs 64, 66, 68, and 70 do not hinder the flow of the fluid passing through chambers 42 and 44 because these ribs are positioned very near the interior periphery 43 of the valve body 12. Thus, in the cross-sectional view of FIG. 6A, supporting ribs 66 and 70 are positioned very near to the rear of the interior periphery 43, and supporting ribs 64 and 68 are not shown in this view because they are positioned very near to the front of the interior periphery 43, which has been cut away to show the cross-sectional view of FIG. 6A.

Referring now to FIGS. 7A and 7B, a second operational mode is depicted. Briefly, in this operational mode, the spool 14 has been rotated approximately 90° from that of the first mode so that the top seal 72 seals the opening 20' of the service inlet port 20. In this mode, the protrusion 102A is seated within a different slot from that of FIG. 6B. In this mode, the protrusion 102A is seated in slot 32A, while slot 30A remains open. It should be noted that although the spool 14 has been rotated, the axial location of the spool within the valve body 12 has not been changed from that of the first operational mode.

The primary purpose of this second operational mode is to allow the user to stop the incoming water flow through service inlet port 20 and its associated opening 20'. Although not clearly shown in FIG. 7A, the lip 86B of FIGS. 2 and 4 prevents fluid from passing from opening 20' and into chamber 44. In this mode, the entire system downstream of the service inlet port 20 can be drained since ports 22, 24, and 26 remain open.

FIGS. 8A and 8B show the third operational mode, which is the bypass mode whereby the water softener is bypassed, whereby untreated water is directed to the dwelling. To achieve this mode, the spool 14 is moved axially to the left, and is rotated back to the position of FIGS. 6A and 6B. In this mode, untreated water enters service inlet port 20, goes through opening 20', travels through chamber 44, and exits the bypass valve through opening 22'. This untreated water is directed to the dwelling via service outlet port 22. As can be seen in FIG. 8A, chamber 42 (which is sealed between partitions 48 and 50) keeps any residual water from opening 24' from leaking out of the bypass valve 10, and chamber 46 (which is sealed between partitions 52 and 54) keeps any residual water from opening 26' from leaking out of the valve. In this mode, as in the first mode of FIGS. 6A and 6B, the supporting rib 70 does not hinder the flow of water through chamber 44 because rib 70 is located very near to the rear wall of the interior periphery 43 of the spool 14.

As can be seen in FIG. 8B, the spool 14 is axially shifted to the left-hand side of the figure with respect to the valve body 12. In this mode, locking snap 104A, which operates in the identical manner to locking snap 104B of FIG. 6B, retains the spool 14 in its axial position. To prevent relative rotation between the spool 14 and the valve body 12, the endcap protrusion 102B is seated within the notch 30B.

FIGS. 9A and 9B show the fourth operational mode of the present bypass valve 10. In this mode, both the service inlet port 20 (and opening 20') and the service outlet port 22 (and opening 22') are closed by the top seal 74, and openings 24' and 26' remain open. To arrive at this mode, the spool 14 is moved axially to the far left, as in the third mode shown in FIGS. 8A and 8B. However, the position of the spool 14 in this mode is rotated approximately 90° from its position in the third mode of FIGS. 8A and 8B.

To maintain the spool in its rotated position, endcap protrusion 102B engages notch 32B. To maintain its axial position, locking snap 104A is activated, as in the mode of FIG. 8B. With regard to the locking snaps 104A and 104B, care must be taken to make sure that the notches 30A, 30B, 32A and 32B do not interfere with the operation of the locking snaps. One simple method of preventing such interference is to make the locking snaps 104A and 105B wider than the notches 30A, 30B, 32A, and 32B. If the locking snaps are wider than the notches, the snaps cannot enter the notches.

Referring now to FIGS. 10–13, a second preferred embodiment of the present bypass valve will be described. Wherever possible, components of the second embodiment that are similar to components of the first embodiment will be numbered with the same reference numbers. Components that are different will be designated with the suffix "X", such as supporting rib 68X of FIG. 10, which is different from supporting rib 68 of FIG. 1.

One of the main differences between the first embodiment and the second embodiment is that the supporting rib 68X of the second embodiment does not include the top seal 74 of the first embodiment. Instead, supporting rib 68X of the second embodiment is essentially identical to supporting rib 70. Accordingly, since the second embodiment lacks the top seal, it cannot operate in the second mode (in which the service inlet port 20 is closed), nor can it operate in the fourth mode (in which both the service inlet port 20 and the service outlet port 22 are closed). Instead, the second embodiment bypass valve only operates in two modes—a normal service mode, in which the water flows through the water softener (the first mode of the first embodiment), and a bypass mode, in which water bypasses the water softener and goes directly into the dwelling (the third mode of the first embodiment).

Figure 11:
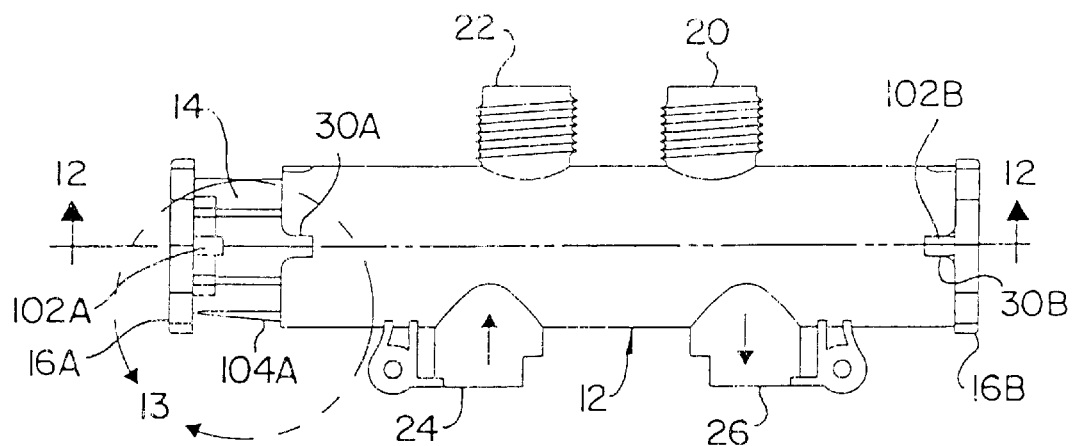
FIG. 11 is an assembled view of the bypass valve of FIG. 10.

Turning now to FIG. 11, the second embodiment bypass valve is shown in bypass mode, which is similar to the bypass mode of the first embodiment shown in FIGS. 8A and 8B. As in the first embodiment, the bypass mode of the second embodiment is realized by axially moving the spool 14 to the far left, and by rotating the spool so that endcap protrusion 102B is seated within notch 30B.

Figure 13:
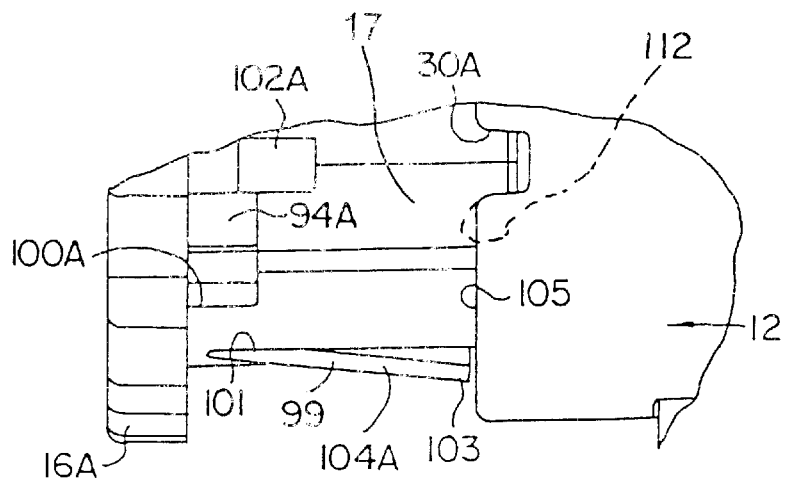
FIG. 13 is an enlarged view of the endcap of FIG. 11, taken within circle A.

The axial position of the spool 14 is maintained by the locking snap 104A. Referring now to FIG. 13, which is an enlarged version of the portion of FIG. 11 enclosed by circle A, the locking snap 104A (which is preferably found in both embodiments) will be described in detail. As shown in FIG. 13, the locking snap 104A is basically a finger 99 that includes a proximal end 101 and a distal or free end 103. In the preferred embodiment, the finger 99 is an integral portion of the wall 17 of the endcap 16A, 16B, and is formed from a segment of the wall. The wall 17 defines a generally cylindrical shape dimensioned to be slidably engaged within an interior of the valve body 12. The finger 99 is inclined radially outwardly in the direction from its proximal end 101 to its distal end 103. In this manner, the finger 99 can abut against axial endwall 105 of the valve body 12 in order to prevent the spool 14 from moving axially in the rightward direction. When such rightward movement is desired, the finger 99 is simply pressed radially inwardly, at which point it can slide under the axial endwall 105.

Figure 14:
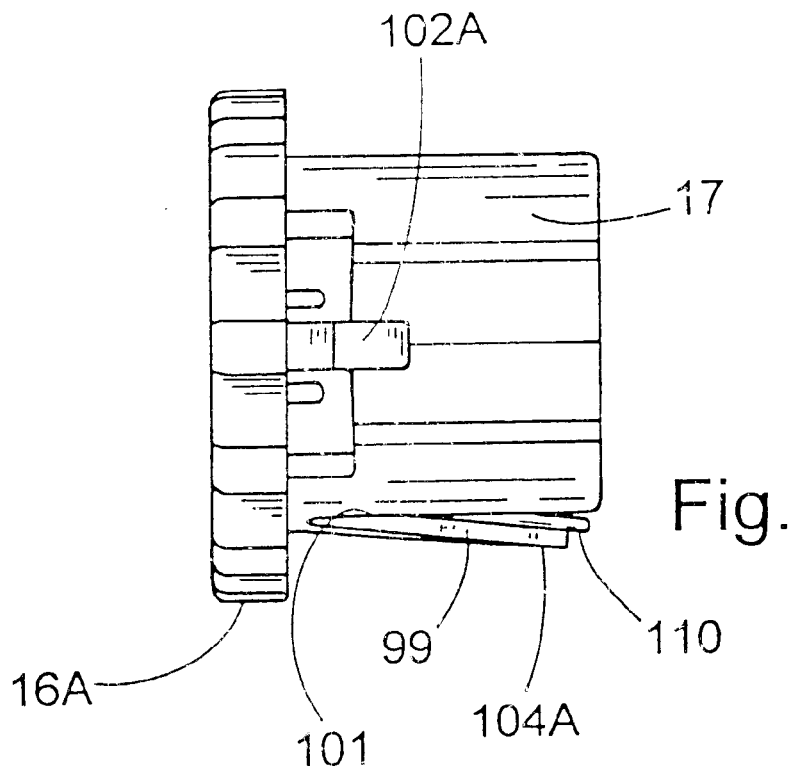
FIG. 14 is a side elevational view of an alternate embodiment of an endcap of the present valve.
Figure 15:
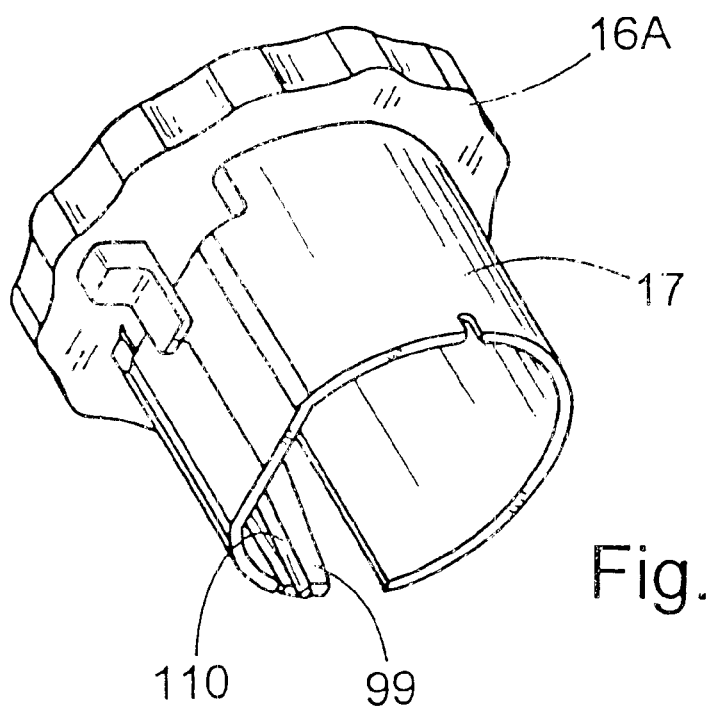
FIG. 15 is a perspective elevational view of the endcap of FIG. 14.

Referring now to FIGS. 13–15, in some cases it has been found that, when the endcap 16A is pressed axially in the rightward direction to adjust the position of the spool 14, in some cases the finger 99 becomes disengaged with the desired underside of the endwall 105, and hyperextends above the exterior of the valve body 12, thus obstructing the axial movement of the spool. More specifically, when the endcap 16A is in the pulled open position (best seen in FIG. 13), the finger 99 has sufficient inherent spring force to ride up over the edge of the endwall 105. Thus, as the endcap 16A is pressed toward the valve body 12, in some cases the finger 99 continues to slide upward over the endwall 105 and the valve body, and eventually prevents further axial movement of the spool 14.

To address this problem, the finger 99 has been modified to be provided with an alignment formation, designated 110, which is configured for maintaining a sliding engagement with the inner surface of the valve body 12. In the preferred embodiment, the finger 99 is provided with an alignment formation taking the form of an extended pin-like lug or other protrusion. The lug 110 is preferably integrally formed with the finger 99, however separate formation and attachment to the finger 99 by adhesive, ultrasonic welding or other techniques known in the art are contemplated. As an alternate construction, the finger 99 could be provided with a depressed, blade-like extension, or other configuration performing the function of preventing the finger from becoming disengaged from the underside or interior wall 112 (best seen in FIG. 1) of the valve body 12. When the formation 110 is provided, the user can more confidently radially depress the finger 99 once the position of the valve spool needs to be changed.

Figure 12:
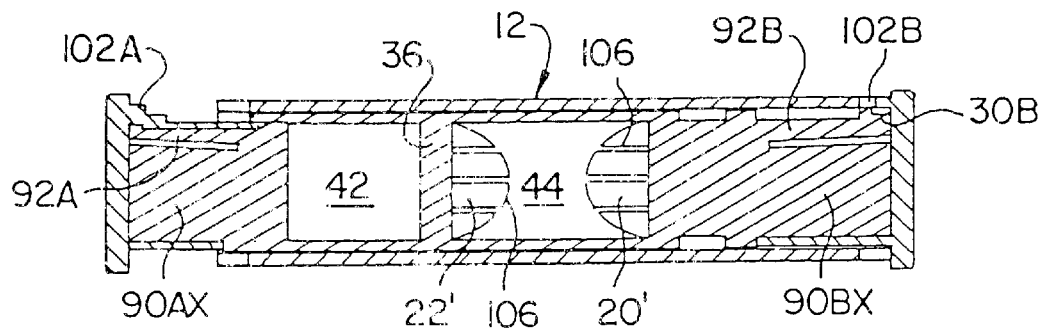
FIG. 12 is a cross-sectional view of the bypass valve of FIG. 10, taken along line XII—XII of FIG. 11.

If desired, a lead-in or groove (not shown) may be provided in the axial endwall located on the opposite side of axial endwall 105. Such a lead-in provides a space for the finger 99 to move axially into, and effectively disables the axial locking function on this side of the device. Such a lead-in may be provided on one side of the device where no axial lock is desired for preventing the valve from switching modes from the service mode to the bypass mode, but the axial lock is still desired for preventing a switch from the bypass mode to the service mode. More specifically, if such a one-sided axial lock is desired in the embodiment as shown in FIGS. 11 and 12, the locking snap 104A on the left side will operate normally (preventing axial movement to the right), but the locking snap on the left side will include a lead-in or groove in the right axial endwall, so axial movement to the left is permitted.

Referring back to FIG. 12, this figure is a cross-sectional view of FIG. 11 taken along line XII—XII. FIG. 12, like FIG. 11, depicts the bypass mode. Accordingly, in this operational mode, fluid enters the service inlet port 20 (and the opening 20'), passes through the chamber 44, and then exits the valve through the opening 22' and the service outlet port 22, without being treated by a water softener or other treatment device. One important feature depicted in FIG. 12 is the axially extending bars 106 that are shown crossing the openings 22' and 20'. Although not shown, similar bars also cross openings 24' and 26'. These bars prevent the o-rings 56, 58, 60, and 62 from expanding into the openings 20', 22', 24' and 26'. Although the o-rings are best shown in the FIG. 1 embodiment, these same o-rings are utilized in both embodiments, and the bars are preferably also included in both embodiments. Without the use of such bars, the o-rings may become dislodged from their grooves (48, 50, 52, and 54, shown in FIG. 1) when they are moved past the openings.

Figure 10:
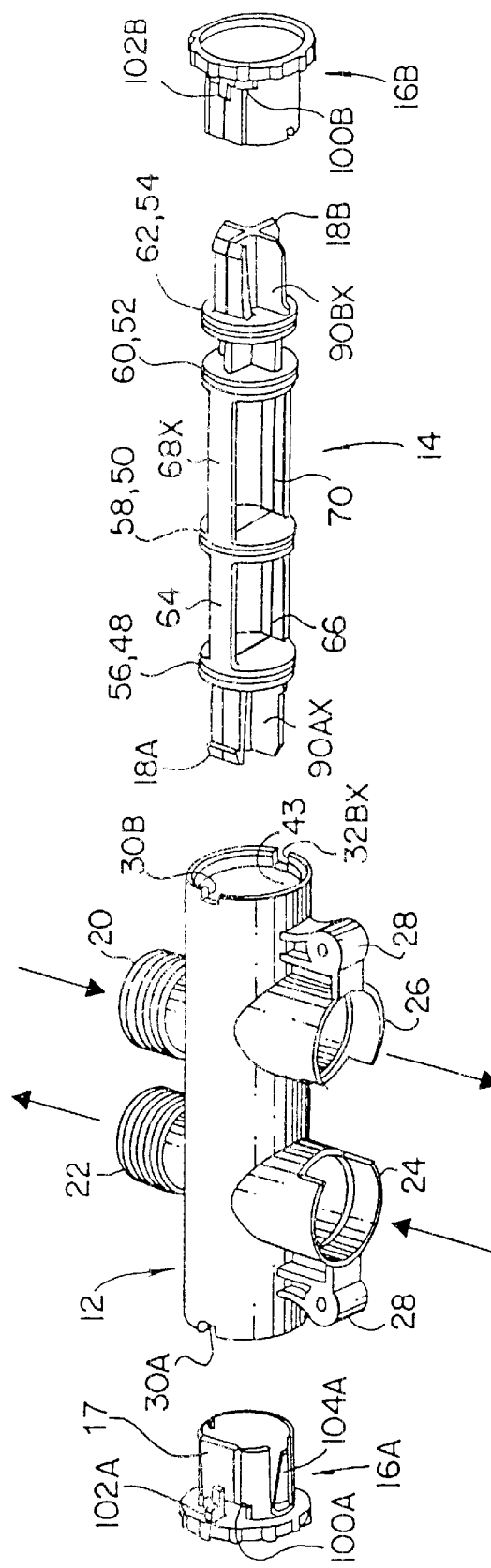
FIG. 10 is an exploded view of a second embodiment of the present bypass valve.

Referring to FIG. 10 in combination with FIG. 12, another difference between the first embodiment and the second embodiment will be discussed. In the second embodiment of FIGS. 10 and 12, legs 90AX and 90BX are shown as being generally cross-shaped in cross-section. In contrast, legs 90A and 90B of FIG. 1 were generally T-shaped. The cross-shaped legs of the second embodiment provide better support, while the T-shaped legs of the first embodiment save on material costs. Legs of either shape may be used in either embodiment, depending upon the desired results (cost savings vs. additional strength).

One final difference between the second embodiment and the first embodiment lies in the positioning of the notches. In the second embodiment, notches 30A and 32AX, as well as notches 30B and 32BX, are positioned approximately 180° apart from each other, as best seen in FIG. 10. In contrast, in the first embodiment, notches 30A and 32A, as well as notches 30B and 32B, are positioned approximately 90° apart from each other, as best seen in FIG. 1. This is the case because in the second embodiment the notches (and the protrusions) help to maintain the spool in positions where the supporting ribs 64, 66, 68X, and 70 do not block the openings 20', 22', 24' and 26'. In contrast, in the first embodiment, the openings are intended to not be blocked in only two of the four modes (the first or normal service mode and the third or bypass mode), and the openings are intended to be blocked by the supporting rib 68 (and the top seal 74) in the other two modes (the second and fourth modes). The 90° notch spacing of the first embodiment allows for such blockage.

In general, the second embodiment is more economical to produce than the first embodiment because it includes less parts since the top seal is missing in the second embodiment. However, many of the benefits of the first embodiment are also realized by the second embodiment. For example, the rotary and axial locking features of the first embodiment are also found on the second embodiment, as well as the feature in which fluid flow through the chambers is essentially uninterrupted by the supporting ribs since the supporting ribs are positioned near the interior periphery of the valve body.

While particular embodiments of the present bypass valve have been shown and described, it will be appreciated by those skilled in the art that changes and modifications may be made thereto without departing from the invention in its broader aspects and as set forth in the following claims.

What is claimed is:

1. A bypass valve for directing fluid flow, said bypass valve comprising:
    a valve body with an underside;
    a spool seated within said valve body, said spool being axially translatable within said valve body;
    at least one endcap attached to an axial end portion of said spool, said endcap including a locking snap positioned on an outer periphery thereof, said locking snap being configured and arranged to maintain said spool in a first axial position with respect to said valve body, wherein when said locking snap is unlocked, said spool may be moved to a second axial position; and
    alignment means for maintaining said locking snap in engagement with said underside of said valve body.

2. The bypass valve according to claim 1, wherein said locking snap consists of a finger that extends generally axially along said endcap, with a proximal end connected to said endcap and a distal end extending outwardly from said outer periphery of said spool, said alignment means extending from said distal end.

3. The bypass valve according to claim 2, wherein:
    said endcap includes an inner end and an outer end, whereby said inner end is closer to said spool than said outer end; and
    said proximal end of said finger is located closer to said outer end of said endcap and said distal end of said finger is located closer to said inner end of said endcap, whereby said distal end of said finger prevents axial movement of said spool within said valve body in a first direction by abutting against an edge of said valve body unless said finger is pressed inwardly, and where said first direction is defined as the direction extending from said endeap toward said valve body.

4. A bypass valve for directing fluid flow, said bypass valve comprising:
    a valve body with an underside;
    a spool seated within said valve body and having a wall, said spool being axially translatable within said valve body;
    at least one endcap attached to an axial end portion of said spool, said endcap including a locking snap positioned on an outer periphery thereof, said locking snap being configured and arranged to maintain said spool in a first axial position with respect to said valve body, wherein when said locking snap is unlocked, said spool may be moved to a second axial position; and
    said locking snap being integrally formed from said wall to have an inherent spring force.

5. The bypass valve according to claim 4 further including an alignment formation provided to said locking snap locking snap in engagement with an underside of said valve body.

6. The bypass valve according to claim 5 wherein said alignment formation is a pin formation extending from a distal end of said locking snap.

* * * * *